United States Patent [19]

Williams et al.

[11] Patent Number: 4,964,466
[45] Date of Patent: Oct. 23, 1990

[54] HYDRAULIC FRACTURING WITH CHLORINE DIOXIDE CLEANUP

[75] Inventors: Dennis A. Williams, Houston; John C. Newlove; Roger L. Horton, both of Kingwood, all of Tex.

[73] Assignee: Exxon Chemicals Patents Inc, Linden, N.J.

[21] Appl. No.: 390,213

[22] Filed: Aug. 7, 1989

[51] Int. Cl.$^5$ .................................................. E21B 43/27
[52] U.S. Cl. ................................ 166/300; 166/305.1; 166/308; 166/268; 166/271; 252/182.13; 252/187.21
[58] Field of Search ...................... 252/182.13, 187.21; 166/300, 308

[56] References Cited

U.S. PATENT DOCUMENTS

| | | | |
|---|---|---|---|
| 4,157,116 | 6/1979 | Coulter | 166/280 |
| 4,779,680 | 10/1988 | Sydansk | 166/308 |
| 4,846,981 | 7/1989 | Brost | 166/273 |
| 4,871,022 | 10/1989 | McGlathery | 166/300 |

Primary Examiner—Ramon S. Britts
Assistant Examiner—R. J. Schoeppel
Attorney, Agent, or Firm—R. L. Graham; J. F. Hunt

[57] ABSTRACT

A method of fracturing a subterranean formation involving the use of crosslinked gels to form a fracture and deposit particulate proppant therein followed by the introduction of dilute aqueous solutions of chlorine dioxide in the propped fracture to degrade the gel.

10 Claims, 2 Drawing Sheets

FIG. 2

(MAG. 50X)

(MAG. 25X)

(MAG. 25X)

(MAG. 30X)

HYDRAULIC FRACTURING WITH CHLORINE DIOXIDE CLEANUP

BACKGROUND OF THE INVENTION

1. Field of the Invention

This invention relates to the hydraulic fracturing of subterranean formations. In one aspect, the invention relates to a method for degrading polymer residue in a hydraulically induced fracture in subterranean formations.

2. Description of the Prior Art

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of a vertical, high-conductivity channels through which fluids can thereafter be injected or produced. The conductivity obtained is a function of the fracture dimensions and the permeability of the bed of propping agent particles within the fracture.

In order to generate the fracture of sufficient length, height, and width and to carry the propping agent particles into the fracture, it is necessary for the fluid to have relatively high viscosity. This viscosity in aqueous liquids is provided by the addition of polymers. Following the treatment of the well, it is desirable to return the aqueous liquid to its low viscosity state, thereby permitting the fracturing fluid and polymer to be removed from the formation and the propped fracture. The highly viscous liquid if left in the fracture would impede the production of formation fluids through the propped fracture. Moreover, the residue of the polymer on the fracture face and in the pores of the propped fracture would significantly reduce fluid permeability therethrough.

To avoid these undersirable after effects of the polymer and polymer residue, it is now common practice to employ in the fracturing fluid chemicals ("breakers") which degrade the polymers U.S. Pat. No. 4,741,401 discloses a number of oxidizing agents contained in capsules for breaking the fracture fluid. U.S. Pat. No. 3,938,594 discloses the use of sodium hypochlorite solution, acid, micellar solutions, and surfactants for degrading the fracturing fluid polymers.

As described in detail in SPE Paper 18862, published Mar. 13–14, 1989, some breakers in fracturing fluids for shallow low temperature (100° F.) treatments are satisfactory for certain polymer gels. This paper further confirms that certain conventional breakers are not effective in fluids gelled with polymers crosslinked with organometallic compounds. For deep, high temperature (175° F. and above) wells, polymers crosslinked with organometallic compounds are generally employed as aqueous viscosifiers. The organometallic crosslinkers were developed for high temperature service exhibiting excellent stability up to about 350° F. Other crosslinkers, such as borate compounds, have an upper temperature limit of about 140° F.

As described in the above SPE Paper, the conventional breakers are not particularly effective with organometallic crosslinked polymers. Moreover, in deep high temperature wells, particularly wells at temperatures in excess of 200° F., breakers cannot generally be used because they tend to degrade the polymer prior to completion of fracture generation phase of the operation.

In these type of wells, clean up of the propped fracture and fracture walls relies on flowing formation fluids therethrough, and may require several months. Acid solutions or other materials sometimes are injected into the propped fracture to assist in polymer degradation. However, these treatments carried out at matrix rates generally results in expending the acid or other compound in the near well bore region (within 10 feet) thereby preventing deep penetration of the active chemical into the fracture.

As demonstrated by the above publications, there is a need for an effective, low cost means for degrading or dissolving polymers in gelled fracturing fluids for deep, high temperature treatments.

As described in detail herein, the present invention involves the use of chlorine dioxide in degrading crosslinked polymers used in high temperature fracturing fluids thereby assisting or effecting cleanup of the fracture. Chlorine dioxide has been proposed for use in a number of oxidizing applications including producing and injection well treatments. For example, Canadian Pat. No. 1,207,269 discloses the use of chlorine dioxide in the separation of oil and water in oil field producing operations. The chlorine dioxide serves as a multifunctional chemical including prevention of sludge and scale, and a biocide for certain compounds in the produced fluid. U.K. Patent Application No. 2170220A also discloses the use of chlorine dioxide in the treatment of wells. In this Application, the chlorine dioxide is added to the produced fluids and serves as a scavenger for hydrogen sulfide. Finally, PCT Application International Publication No. W085/01722 discloses the use of chlorine dioxide in the treatment of produced fluids to eliminate sulfide at oil water interphases. These prior uses of chlorine dioxide have been restricted to produced fluids.

Chlorine dioxide has also been used to degrade polymer in polymer flooding injection wells. In this application, the chlorine dioxide treatment is on noncrosslinked polymers, and effective only in the well perforations and near wellbore region (within 10 feet). Polymer solutions used in polymer flooding are generally dilute solutions containing much less polymer than in fracturing fluids.

SUMMARY OF THE INVENTION

The present invention is directed at cleaning fractures generated by gelled fracturing fluids (e.g. those containing cross-linked polymers) in deep, high temperature wells (175° F. to 450° [350°] F. and above). The fracturing fluids used in these wells are typically guar, guar derivatives, acrylamide, acrylamide derivatives, cellulose and cellulose derivatives, crosslinked with an organometallic compounds or other compounds providing covalent bonding.

The method according to the present invention comprises five essential steps: (1) injecting a viscous, gelled fracturing fluid through a wellbore and into a subterranean formation at a rate sufficient to form a vertical fracture in the formation, the fracturing fluid generally containing propping agent particles, and other additives for maintaining the fracture in a propped condition; (2) backflowing the [gelled] fracturing fluid through the wellbore to remove substantial amounts of the gelled fluid from the propped fracture; (3) injecting an aqueous solution of chlorine dioxide into the fracture to penetrate deeply in the propped fracture to degrade the polymer and dissolve substantial amounts of the residue polymer in the propped fracture and on the fracture walls; (4) permitting the aqueous chlorine dioxide to react with the polymer; and (5) producing fluid from the formation through the propped fracture into the wellbore.

The amount of the chlorine dioxide solution injected into the fracture should be sufficient to penetrate at least 20%, and preferably at least 50%, and most preferably at least 75%, of the fracture length. The chlorine dioxide concentration in the aqueous medium may range from 50 to 4200 ppm, preferably between about 100 to 2000 ppm, and most preferably, between 100 and 1000 ppm. These minor but effective amounts of chlorine dioxide makes this treatment economically attractive compared to alternative breakers and oxidants; particularly at the severe treating conditions encountered in deep, high temperature wells.

DESCRIPTION OF THE PREFERRED EMBODIMENTS

In the fracturing of subterranean formations, a viscous fracturing fluid is pumped through the wellbore at a rate and pressure to cause a vertical fracture to form in the formation. The fracture generally extends out from 300 to 400 feet from the wellbore for oil wells and from 800 to 1200 feet for gas wells. In order to generate fracture of this magnitude, the fluid must be viscosified with a gel, (e.g. water-soluble polymers). The polymers commonly used in deep, high temperature wells are cross-linked polymers such as guar, hydroxypropyl guar and carboxy-methylhydroxypropyl guar and are present in the aqueous fracturing fluid at concentrations from about 10 to 80 pounds per 1000 gallons. Other polymers for high temperature service (i.e. above 175° F.) include carboxymethyl [and] hydroxyethyl cellulose, acrylamide copolymers, crosslinked with organotitanate, organozirconate, aluminum, and antimony compounds.

Tests have shown that if these gelled fluids and their residue are not removed following the fracture treatment, the conductivity of the propped fracture can be reduced by as much as 90%. The damage is due to two types of plugging: (1) the residue on the fracture walls caused by the filter cake buildup thereon, and (2) by the viscous fluid and residue left in the pores of the propped fracture.

Tests have also shown that the damage to the fracture is more severe in high temperature wells because only certain cross-linked fluids (e.g. those crosslinked with organometallic cross-linkers) can be used. These cross-linked, gels generally present in the fracturing fluid at concentrations ranging from 0.25 to 1.00 wt%, are difficult to break. Moreover, as mentioned above, for deep wells, breakers frequently cannot be used.

Figure 1:
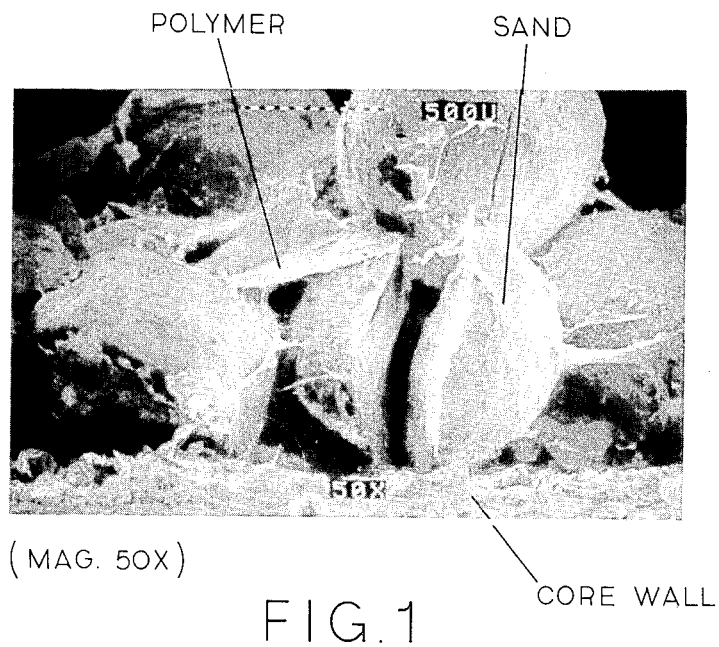
FIG. 1 is a magnified (50X) photograph of a simulated propped fracture illustrating polymer residue (guar) in the pores thereof and fracture wall.
Figure 3:
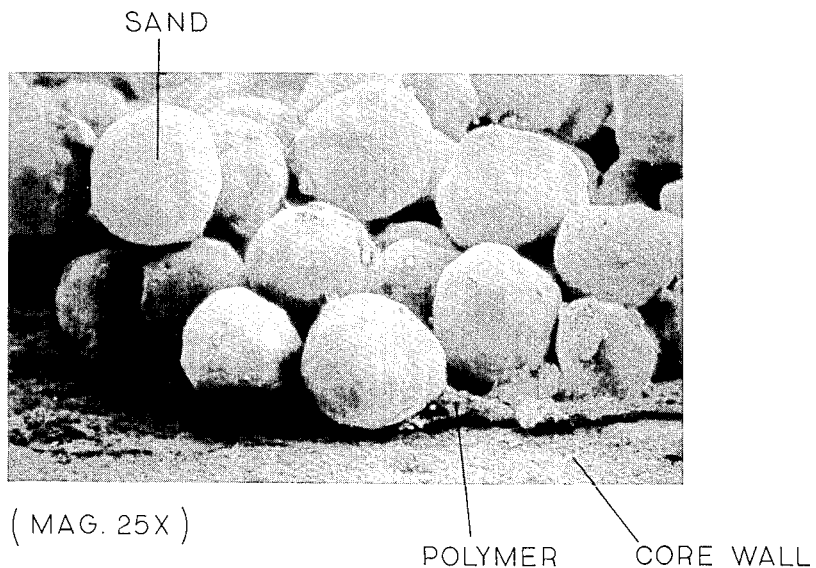
FIG. 3 is a magnified (25X) photograph similar to FIG. 1 illustrating polymer residue (HPG) in the pores thereof and on the fracture walls.

FIGS. 1 and 3 show the residue left on the propped particles and fracture walls of a simulated propped fracture based on laboratory tests. Prior to treatment in accordance with the present invention, these propped fractures had retained permeabilities of only 23.7% and 25.3%, respectively. (Retained permeability is damaged permeability divided by undamaged permeability times 100.)

The method of the present invention employs dilute aqueous solutions of chlorine dioxide to degrade the polymer and dissolve polymer residue in the fracture and on the fracture walls. The chlorine dioxide solution is injected into the propped fracture following the fracturing treatment and flow back of the well. The injection is at matrix rates and is in such amounts to provide deep penetration into the propped fracture. One of the advantages of the chlorine dioxide is that it is not reactive with most formation materials and at the dilute concentration is not unduly corrosive.

The amount and concentration of the chlorine dioxide solution will depend upon several factors, including the length of the fracture generated, the degree of difficulty in degrading the polymer, temperature, and fracture geometry. Normally however, the concentration of the chlorine dioxide in the aqueous medium will be between 50 and 4,200 ppm, preferably 100 to 2000 ppm, and most preferably between 100 and 1000 ppm. The volume of this solution will be injected to invade at least 20% of the propped fracture. Thus, for most oil wells, the solution penetration will be at least 60 feet and for most gas wells at least 100 feet. The upper limit of the volume will be dictated by economics but ten pore volumes of the propped fracture will be sufficient for most applications. Preferably from .2 to 10 pore volumes will be injected. The fracture pore volume is defined as the calculated pore volume of the propped fracture following bleed off.

The chlorine dioxide may be used as a aqueous solution generated at the site of use. As is known, chlorine dioxide is a unstable highly reactive gas which is soluble in and decomposes in water. Because of its instability, it is common for chlorine dioxide to be generated at the point of use and used immediately. Several methods of onsite preparation of chlorine dioxide is described as for example in U.S. Pat. Nos. 4,077,879; 4,247,531; and 4,590,057; all of which are incorporated herein by reference.

Alternatively, the chlorine dioxide may be added in the form of stabilized chlorine dioxide solution. Stabilized chlorine dioxide is a compound which dissociates and tends to maintain the available chlorine dioxide in the aqueous solution at a fixed level. DIKLOR marketed by Exxon Chemical Company is a stabilized chlorine dioxide.

Operation

Prior to commencing pumping operations, aqueous chlorine dioxide is generated at the well site. DIKLOR S generated by a system provided by Exxon Chemical Company is one source of chlorine dioxide. This system generates aqueous chlorine dioxide at concentration levels of 1 to about 4,200 ppm. As a general rule, and subject to economics, the amount of chlorine dioxide needed will depend on the amount of polymer used in the fracturing fluid.

The weight ratio of chlorine dioxide to polymer will range from about 1:5 to 1:100 with 1:10 to 1:50 being preferred.

For many treatments, 3,000 to 20,000 gallons of the dilute (50 to 4200 ppm) chlorine dioxide will by prepared in a rig tank. Alternatively, where generated chlorine dioxide is used (e.g. DIKLOR S), the aqueous chlorine dioxide may be generated and pumped down the well alone or with other fluids (including water) at the generation rate.

In a preferred embodiment of the invention, the fracturing operation will be carried out in the normal manner which may involve the following injection sequence: a preflush (a pad of gelled aqueous fracturing fluid without proppant), followed by the fracturing fluid with proppant. The aqueous fracturing fluid will normally have a neutral pH (6-8) although acid or base pH may also be employed (pH 3 to 10). The fracture is generated and propagated as pumping continues to permit the placement of the propping agent. The fracture is then permitted to close on the propped fracture with the fluid bleeding off into the formation. The well is normally shut in for a period ranging from 2 to 24 hours. The well then is backflowed to remove a portion of the gelled fracture fluid from the propped fracture. Backflowing causes formation fluids to displace a portion of the fracturing fluid in the propped fracture. The amount of backflowing will vary but from 0.2 to 0.9 pore volume of the propped fracture volume are typical to remove at least 10% of the polymers from the propped fracture. Following the backflowing step, the aqueous chlorine dioxide solution is injected into the formation at matrix rates to penetrate deeply into the fracture. The active chlorine dioxide should penetrate at least 60 feet and preferably at 100 feet into the propped fracture. The well is then shut in for a period ranging from 1 to 24 hours to permit the chlorine dioxide to react and degrade and/or dissolve the polymer. It should be noted that the chlorine dioxide reacts with the polymer on the fracture face as well as the polymer residue in the pores of the propped fracture.

The fracturing fluid used in the treatment of wells may also include other additives such as fluid loss additives, corrosion inhibitors, buffers, clay stabilizers, nonemulsifiers, surfactants, etc.

The following laboratory experiments demonstrate the severity of fracture plugging caused by gelled fracturing fluids and the effectiveness of chlorine dioxide solution in fracture cleanup.

EXPERIMENTS

| Equipment: | |
|---|---|
| Test Cell | Two core slabs (Ohio Sandstone) samples were retained in an apparatus and positioned to have confronting faces to simulate a horizontal fracture. Pumping, flowline, and temperature control facilities were provided to control injection into the space between the cores, leak off from the cores, and temperature of the core and fluids. |
| Materials: | |

EXPERIMENTS-continued

| | |
|---|---|
| 2 wt % KCl water solution (core saturation) | |
| Frac Fluid: | |
| Pad | 2 wt % KCl water solution |
| Base Gel | Sample A: hydroxypropyl guar (HPG)[2] |
| | Sample B: guar[1] |
| | Sample C: acrylamide base |
| Crosslinked Gel | Sample A: HPG with titanate[3]. |
| | Sample B: Guar with titanate[3]. |
| | Sample C: Acrylamide base polymer with titanate[3]. |
| Proppant | 20/40 mesh sintered alumina proppant[4]. |
| Chlorine Dioxide | 0.42% aqueous solution[5]. |
| Test Procedure: | |

The fluid injected (at 2 ml/min.) into the cell in each test was in the following sequence.

| | Flow Time |
|---|---|
| 2% KCl water solution | 10 min. |
| Base gel | 10 min. |
| Crosslinked gel | 90 min. |
| Crosslinked gel with proppant | packed to desired concentration |

[1]marketed by Aqualon Co. or Hi-Tek Polymers, Inc.
[2]marketed by Aqualon Co. or Hi-Tek Polymers, Inc.
[3]marketed by DuPont as Tyzor GBA
[4]marketed by Norton Abrasives as Interprop Plus
[5]marketed by Exxon Chemical Company as DIKLOR S The fracturing fluid was mixed and sheared to simulate pumping through the well tubing. The fluid was sheared and heated to 150° F. and pumped at a shear rate of 40-50/sec into the cell maintained at 120° F. The cell temperatures was set at 120° F. to model cooldown. The leakoff rate from each core was monitored vs time. A back pressure of 1000 psi was maintained on the cell. Residence time in the cell was approximately 5 minutes.

The proppant amount was selected in each test to provide 2 lb/sq ft in the ⅛ inch slot separating the core faces in the cell. Once the proppant was placed, a closure stress of 1000 psi was applied. The cell was shut-in at the control temperature (250° F.) and allowed to set for 10 hours.

The cell was then opened and backflow was simulated by pumping 2% KCl at 2ml/min for 50 min., while closure stress was increased to 8000 psi.

Chlorine dioxide (DIKLOR S) was then flushed alternately through (a) the packed space and (b) through a portion of the packed space and vertically through the core slabs (by means of bleed off valves in the top and bottom of the apparatus holding the slabs core). The cell was shut in and production simulated by flowing 2% KCl through the cell at 2 ml/min for 50 hrs. Conductivity and permeability of the packed spaced (e.g. packed fracture) were recorded hourly and represented in the Tables as a 10 hour average.

EXPERIMENT No. 1 (SAMPLE A)

The 2% KCl and base gel and crosslinked gel were injected into the cell as described above. The gel concentration was 40 lb/1000 gallon. The initial chlorine dioxide treatment was with 500 ppm (DIKLOR S) which was flowed alternately through the cell at 2 ml/min at 10 min. intervals as follows 10 min. through the pack
10 min. through one core slab
10 min. through the other core slab
10 min. through the pack
Closed in for 4 hours The second chlorine dioxide treatment was with 1000 ppm DIKLOR S which was flowed at 1 ml/min through the pack and cores in the following sequence 25 min. through pack
40 min. through core slabs
60 min. through pack
The cell shut in for 2 hours.
Table I presents the recorded data.

TABLE I

|  | HOURS AFTER CLOSURE | CLOSURE STRESS (psi) | CONDUCTIVITY (md.ft.) | WIDTH (in.) | PERM. (Darcies) |
| --- | --- | --- | --- | --- | --- |
| Before Treatment | 0 | 8000 | 680 | 0.186 | 43.9 |
| After Initial Treatment | 10 | 8000 | 1467 | 0.184 | 95.7 |
| After Second Treatment |  |  |  |  |  |
|  | 20 | 8000 | 1135 | 0.180 | 75.7 |
|  | 50 | 8000 | 1161 | 0.180 | 77.4 |

The percent retained permeability was 43% (2% KCl solution). This represents an 81% improvement. The equilibrium leakoff rate was 0.0114 ml/min/sqcm. and the Cw was 0.00281 ft/sq. root min. (Cw is the combined fluid loss coefficient of the fracturing fluid.)

Figure 4:
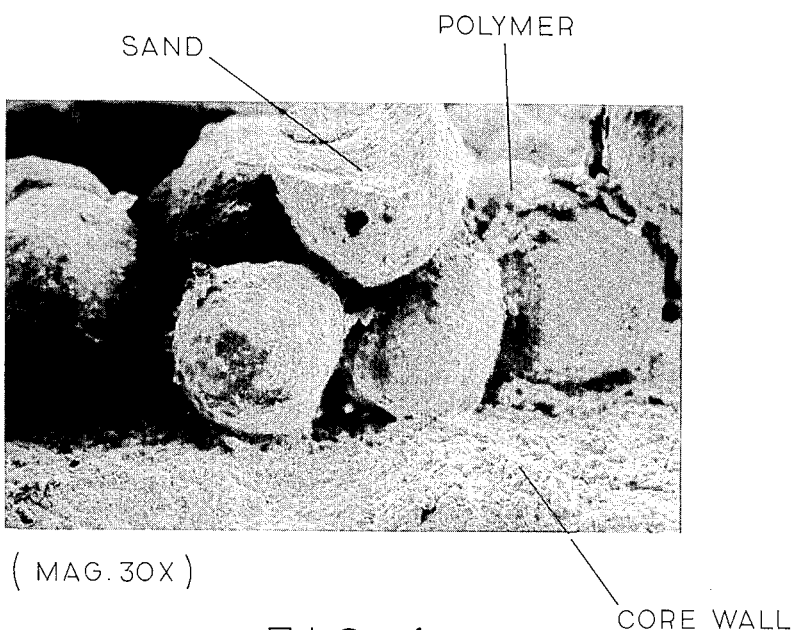
FIG. 4 is a magnified (30X) photograph similar to FIG. 3, illustrating the condition of the propped fracture following treatment with chlorine dioxide.

FIG. 3 illustrates considerable polymer on the fracture face as a filter cake prior to treatment. FIG. 4 taken after treatment illustrates a clean fracture face.

EXPERIMENT NO. 2 (SAMPLE B)

Experiment No. 2 used Sample B and was similar to Experiment No. 1 except only one chlorine dioxide treatment (1000 ppm DIKLOR-S) was used. DIKLOR-S was flushed through the cell at 1 ml/min in the following sequence:
25 min. through pack
40 min. through core slabs
60 min. through pack
The cell was then shut in for 2 hours. The data for the simulated fracture are presented in Table II.

TABLE II

|  | HOURS AFTER CLOSURE | CLOSURE STRESS (psi) | CONDUCTIVITY (md.ft.) | WIDTH (in) | PERM. (Darcies) |
| --- | --- | --- | --- | --- | --- |
| Before Treatment |  |  |  |  |  |
|  | 0 | 8000 | 707 | 0.184 | 46.1 |
|  | 10 | 8000 | 1041 | 0.182 | 68.6 |
| After Treatment |  |  |  |  |  |
|  | 18 | 8000 | 877 | 0.181 | 58.5 |
|  | 30 | 8000 | 1135 | 0.180 | 75.7 |
|  | 50 | 8000 | 1299 | 0.180 | 86.6 |

Retained permeability was 48% (2% KCl solution), or 98% improvement over the damaged untreated propped fracture. Equilibrium Leakoff rate was 0.0119 ml.min/sqcm. Cw was 0.00285 ft/sq. root min.

Figure 2:
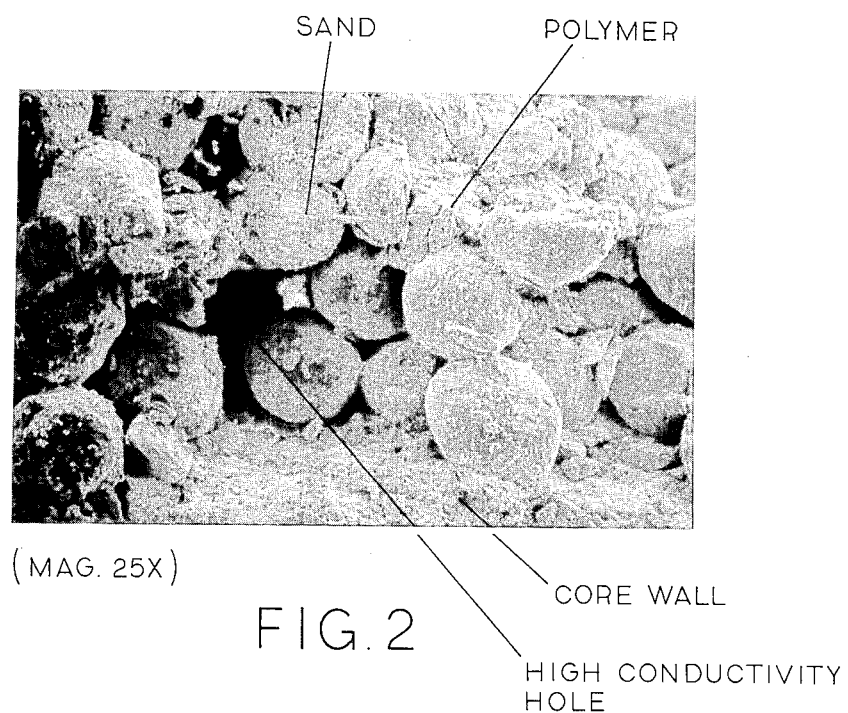
FIG. 2 is a magnified (25X) photograph of a simulated propped fracture showing the condition of the propped fracture following treatment with chlorine dioxide.

FIG. 1 illustrates the presence of guar in the pores and on the fracture wall prior to treatment. However, as illustrated in FIG. 2, the chlorine dioxide treatment removed substantial amounts of the polymer residence from the pores and the walls.

EXPERIMENT NO. 3 (SAMPLE C)

Experiment No. 3 was carried out with Sample C.

This test was similar to Experiments 1 and 2 except the chlorine dioxide flushing was as follows:

250 ppm DIKLOR-S flowed at 1 ml/min through the pack for 80 min., followed by 1 hour shut-in, and finally 250 ppm DIKLOR-S was flowed through the core slabs for 80 min. at 0.5 ml/min and then through the pack for 20 min. at 1 ml/min.

The cell was then shut-in for 1 hour.

Table III presents the data for the simulated fracture:

TABLE III

|  | HOURS AFTER CLOSURE | CLOSURE STRESS (psi) | CONDUCTIVITY (md.ft.) | WIDTH (in) | PERM. (Darcies) |
| --- | --- | --- | --- | --- | --- |
| Before Treatment |  |  |  |  |  |
|  | 0 | 8000 | 445 | 0.186 | 28.7 |
| After Treatment |  |  |  |  |  |
|  | 10 | 8000 | 765 | 0.184 | 49.9 |
|  | 250 | 8000 | 1702 | 0.180 | 113.5 |
|  | 30 | 8000 | 2273 | 0.180 | 151.5 |
|  | 50 | 8000 | 2335 | 0.180 | 155.7 |

Retained permeability was 86% (2% KCl), more than five times higher than the untreated damaged propped fracture. Cw - 0.00313 ft/sq. root min.

The improved results demonstrated by the above experiments are believed due to the following three factors: (a) the viscous crosslinked polymer fluid is broken, (b) high conductivity holes are formed in the propped fracture (best seen in FIG. 2), and (c) elimination of residue on the fracture wall (compare FIGS. 3 and 4).

The chlorine dioxide in addition to reacting with the polymer gelling agent will also react with resinous fluid loss additives.

These tiny resinous particles reduce fluid loss of the fracturing fluid by forming, or assist in forming, a filter cake on the fracture wall. Typically, resinous fluid loss additives are made of $C_5$ olefinic compounds. One such commercial material is marketed by Hercules Chemical Company as Piccovar AB-180.

It is desirable to remove the filter cake containing the polymer and resinous fluid loss additives following treatment to increase permeability of formation fluids into and through the propped fracture.

Laboratory tests on mixtures of resin and polymers (guar and HPG) in 2% KCl at 180.F indicated that the chlorine dioxide reacts with both the resin and the polymer gelling agent. The reaction is faster with the gelling agent polymer than with the resin.

The resinous fluid loss additive in the filter cake thus limits chlorine dioxide leak off into the formation permitting deep penetration of active chlorine dioxide into the propped fracture. However, with time, the resin is also degraded by the chlorine dioxide.

What is claimed is:

1. A method for fracturing a subterranean formation penetrated by a wellbore which comprises
   (a) injecting a fracturing fluid into the formation to form a vertical fracture therein, the fracturing fluid being gelled with a polymer selected from guar, guar derivatives, acrylamide, acrylamide derivatives, cellulose, cellulose derivatives, and mixtures thereof and crosslinked with an organometallic crosslinking compound and having temperature stability above about 175° F.;
   (b) packing the fracture with particulate propping agent;
   (c) backflowing fluids from the formation through the propped fracture to remove a portion of the polymer;
   (d) injecting at matrix rates sufficient aqueous solution of chlorine dioxide down the wellbore and into the propped fracture to penetrate at least 60 feet of the propped fracture length and contact polymer in the fracturing fluid and polymer residue in the propped fracture and on the fracture walls, the amount of the chlorine dioxide in the aqueous medium being sufficient to degrade polymer in the fracturing fluid and polymer residue;
   (e) permitting the chlorine dioxide to remain in contact with the polymer in the fracturing fluid and with the polymer residue on the fracture walls and in the fracture for sufficient time to degrade the polymer thereby reducing the fracturing fluid viscosity and dissolving portions of the polymer residue; and
   (f) flowing formation fluid from the formation through the propped fracture and into the wellbore to remove substantial portions of the polymer and degraded polymer from the fracture.

2. The method of claim 1 wherein the concentration of the chlorine dioxide in the aqueous solution is between 100 and 1000 ppm.

3. The method of claim 1 wherein the total amount of chlorine dioxide injected in step (b) is from 1 to 20 wt% of the total polymer injected in the fracture.

4. The method of claim 1 wherein at least 10 wt% of the polymer used in the fracturing fluid is backflowed out of the fracture in step (a).

5. The method of claim 1 wherein the fracture has a half length of at least 100 feet.

6. The method of claim 1 wherein the fracturing fluid further contains resinous fluid loss additive reactable with the chlorine dioxide.

7. The method of claim 1 wherein the weight ratio of the chlorine dioxide to polymer used in the fracturing fluid is not greater than 1:5 and not less than 1:50.

8. The method of claim 1 wherein the crosslinked polymer has thermal stability of 200° F. and above.

9. The method of claim 8 wherein the volume of chlorine dioxide solution injected is from 0.2 to 10 pore volumes of the propped fracture.

10. The method of claim 8 wherein the concentration of the chlorine dioxide in the aqueous medium is from 100 to 1000 ppm.

* * * * *